US012563114B2

(12) United States Patent
Wang et al.

(10) Patent No.: US 12,563,114 B2
(45) Date of Patent: Feb. 24, 2026

(54) CONTENT INITIALIZATION METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Guoxia Wang, Beijing (CN); Long Li, Beijing (CN); Zhihua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 443 days.

(21) Appl. No.: 18/020,618

(22) PCT Filed: Aug. 1, 2022

(86) PCT No.: PCT/CN2022/109455
§ 371 (c)(1),
(2) Date: Feb. 9, 2023

(87) PCT Pub. No.: WO2023/147718
PCT Pub. Date: Aug. 10, 2023

(65) Prior Publication Data
US 2024/0275848 A1    Aug. 15, 2024

(30) Foreign Application Priority Data
Feb. 7, 2022    (CN) .......................... 202210117040.9

(51) Int. Cl.
*H04L 67/1097* (2022.01)
*G06F 7/58* (2006.01)

(52) U.S. Cl.
CPC .......... *H04L 67/1097* (2013.01); *G06F 7/582* (2013.01); *G06F 7/588* (2013.01)

(58) Field of Classification Search
CPC ....... H04L 67/1097; G06F 7/582; G06F 7/588
See application file for complete search history.

(56) References Cited

U.S. PATENT DOCUMENTS

| 2005/0071580 A1 | 3/2005 | LeClerg et al. |
| 2005/0193085 A1* | 9/2005 | Shimizu ................ G06F 9/5016 |
| | | 709/216 |

(Continued)

FOREIGN PATENT DOCUMENTS

| CN | 1661570 | 8/2005 |
| CN | 111104459 | 5/2020 |

(Continued)

OTHER PUBLICATIONS

International Search Report and Written Opinion issued in International Application No. PCT/2022/109455, dated Oct. 26, 2022.

(Continued)

*Primary Examiner* — Chat C Do
*Assistant Examiner* — Selina Elisa Hu
(74) *Attorney, Agent, or Firm* — Pillsbury Winthrop Shaw Pittman, LLP

(57) ABSTRACT

The present disclosure provides a content initialization method and apparatus, an electronic device and a storage medium, which relates to a field of computer technology, in particular to fields of deep learning and distributed computing. The content initialization method is applied to any one of a plurality of devices included in a distributed system. A specific implementation scheme of the content initialization method is: determining, according to a size information of a resource space for the distributed system and an identification information of the any one of the plurality of devices, a space information of a first sub-space for the any one of the plurality of devices in the resource space, wherein the space information includes a position information of the first sub-space for the resource space; and determining an ini- (Continued)

400 tialization content for the first sub-space according to a random seed and the position information.

15 Claims, 4 Drawing Sheets

(56)                    References Cited

U.S. PATENT DOCUMENTS

| 2008/0263117 | A1  | 10/2008 | Rose et al. | |
| 2012/0005253 | A1  | 1/2012  | Mariovet et al. | |
| 2012/0005307 | A1  | 1/2012  | Das et al. | |
| 2013/0339605 | A1  | 12/2013 | Factor et al. | |
| 2014/0129883 | A1* | 5/2014  | Spruth | G11C 7/24 |
|              |     |         |        | 714/E11.169 |
| 2015/0261663 | A1  | 9/2015  | Dumas | |
| 2019/0073130 | A1* | 3/2019  | Xu | G06F 3/0643 |
| 2019/0156183 | A1* | 5/2019  | Durham | G06N 3/047 |
| 2019/0317825 | A1  | 10/2019 | O'Neal et al. | |
| 2020/0136909 | A1* | 4/2020  | Eaton | H04L 41/0873 |
| 2020/0218927 | A1  | 7/2020  | Arunachalam | |
| 2022/0004648 | A1* | 1/2022  | Esbensen | H04L 9/0894 |

FOREIGN PATENT DOCUMENTS

| CN | 112395071 | 2/2021 |
| CN | 113032152 | 6/2021 |
| CN | 113328948 | 8/2021 |
| CN | 113454614 | 9/2021 |
| CN | 114466012 | 5/2022 |

OTHER PUBLICATIONS

Office Action issued in corresponding Chinese Patent Application No. 202210117040.9, dated Sep. 1, 2022.
Q. Li, "Research on Cluster Resource Scheduling Optimization for Distributed Deep Learning", Nanjing University, pp. 1-83 (May 25, 2020).
Training skills in deep learning, pp. 171-173 (2022).

* cited by examiner

100

200

According to a size information of a resource space for a distributed system and an identification information of any one of devices, a space information of a first sub-space for any one of the devices in the resource space is determined    S210

An initialization content for the first sub-space is determined according to a random seed and the position information    S220

300

400

600

CONTENT INITIALIZATION METHOD, ELECTRONIC DEVICE AND STORAGE MEDIUM

CROSS REFERENCE TO RELATED APPLICATION(S)

This application is the U.S. national phase entry of PCT Patent Application No. PCT/CN2022/109455 filed Aug. 1, 2022, which claims priority to Chinese Patent Application No. 202210117040.9 filed on Feb. 7, 2022, the content of which is incorporated herein in its entirety by reference.

TECHNICAL FIELD

The present disclosure relates to a field of computer technology, in particular to fields of deep learning and distributed computing, and more specifically, to a content initialization method, an electronic device and a storage medium.

BACKGROUND

With a development of computer technology and network technology, deep learning technology has been widely used in various fields. Deep learning technology often needs to rely on a large amount of resource space to achieve, and limited by a space capacity of a single processing device. A distributed system has been developed.

SUMMARY

The present disclosure aims to provide a content initialization method, an electronic device and a storage medium.

According to an aspect of the present disclosure, there is provided a content initialization method applied to any one of a plurality of devices included in a distributed system, wherein the method includes: determining, according to a size information of a resource space for the distributed system and an identification information of the any one of the plurality of devices, a space information of a first sub-space for the any one of the plurality of devices in the resource space, wherein the space information includes a position information of the first sub-space for the resource space; and determining an initialization content for the first sub-space according to a random seed and the position information.

According to another aspect of the present disclosure, there is provided an electronic device including: at least one processor; and a memory communicatively coupled with the at least one processor; wherein the memory stores instructions executable by the at least one processor, and the instructions, when executed by the at least one processor, cause the at least one processor to implement the content initialization method provided by the present disclosure.

According to another aspect of the present disclosure, there is provided a non-transitory computer readable storage medium storing computer instructions, wherein the computer instructions are configured to cause a computer to implement the content initialization method provided by the present disclosure.

It should be understood that the content described in this part is not intended to identify the key or important features of the embodiments of this disclosure, nor is it used to limit the scope of this disclosure. Other features of the present disclosure will be readily understood by the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The present disclosure provides a content initialization method applied to any one of a plurality of devices included in a distributed system. The method includes a space information determining stage and a content determining stage. In the space information determining stage, according to a size information of a resource space for the distributed system and an identification information of the any one of the plurality of devices, a space information of a first sub-space for the any one of the plurality of devices in the resource space is determined. The space information includes a position information of the first sub-space for the resource space. In the content determining stage, an initialization content for the first sub-space is determined according to a random seed and the position information.

The application scenario of the method and apparatus provided in the present disclosure will be described below with reference to FIG. 1.

Figure 1:
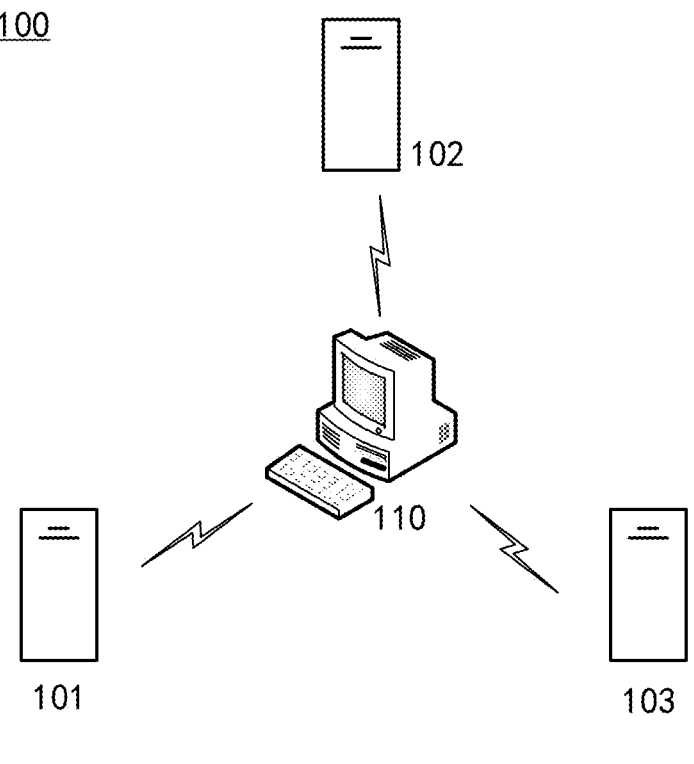
FIG. 1 is a schematic diagram of scenario in which a content initialization method and apparatus according to an embodiment of the present disclosure are applied.

FIG. 1 is a schematic diagram of scenario in which a content initialization method and apparatus according to an embodiment of the present disclosure are applied.

As shown in FIG. 1, an application scenario 100 of the embodiment may include a distributed system, which may include a plurality of devices (e.g. devices 101 to 103). Each of the plurality of devices may be a computing device such as CPU, GPU, or a storage device such as memory. The plurality of devices may be integrated into various electronic devices with processing functions. The various electronic devices may include, but are not limited to, laptop computers, desktop computers, servers, and so on. Each of the plurality of devices may be integrated into an electronic device, or at least two of the plurality of devices may be integrated into a same electronic device, which is not limited in the present disclosure.

The application scenario 100 may also include an electronic device 110, which may, for example, provide a user interface. The electronic device 110 may, for example, communicate with a plurality of devices 101 to 103 through a network. The network may include, for example, a wireless or wired communication link.

In one embodiment, the distributed system may allocate resource space for each of the plurality of devices to perform deep learning tasks by calling the resource space allocated for the plurality of devices. Each device may reserve the allocated resource space for calling. Each device may reserve the allocated resource space by initializing the allocated resource space. Among them, initialization indicates that giving a data writing space, an initialization method is used to initialize a content. Each device may achieve the initialization, for example, by writing 0 or 1 to the allocated resource space. Alternatively, the distributed system may generate content initialization value(s) of the resource space allocated to the plurality of devices by virtue of a space (such as the resource space of the electronic device 110) shared by the plurality of devices. Then each device copies the content initialization value(s) corresponding to its allocated resource space from the shared space, and writes the content initialization value(s) into its local resource space, so as to complete an initialization of the resource space.

In one embodiment, it is also possible for a user to input an attribute information of the resource space, which is required by the distributed system to complete a deep learning task, and an attribute information of the resource space allocated for the plurality of devices, through the user interface provided by the electronic device 110. Each of the plurality of devices 101-103 may obtain an information input from the electronic device 110, and initialize the resource space allocated for it according to the input information, so as to reserve the resource space for the deep learning task for calling.

It may be understood that the resource space may be, for example, a resource space required for computing, or a resource space required for storing data, which is not limited in the present disclosure.

It should be noted that the content initialization method provided in the present disclosure may be implemented by any one of the devices 101 to 103. Accordingly, a content initialization apparatus provided by the present disclosure may be set in any one of the devices 101 to 103, or in an electronic device integrated with the devices 101 to 103.

It should be understood that the number and type of the devices 101 to 103 and electronic device 110 in FIG. 1 are only schematic. According to implementation needs, there may be any number and type of devices 101 to 103 and the electronic device 110.

A content initialization method provided in the present disclosure will be described in detail in the following FIGS. 2 to 5 with reference to FIG. 1.

Figure 2:
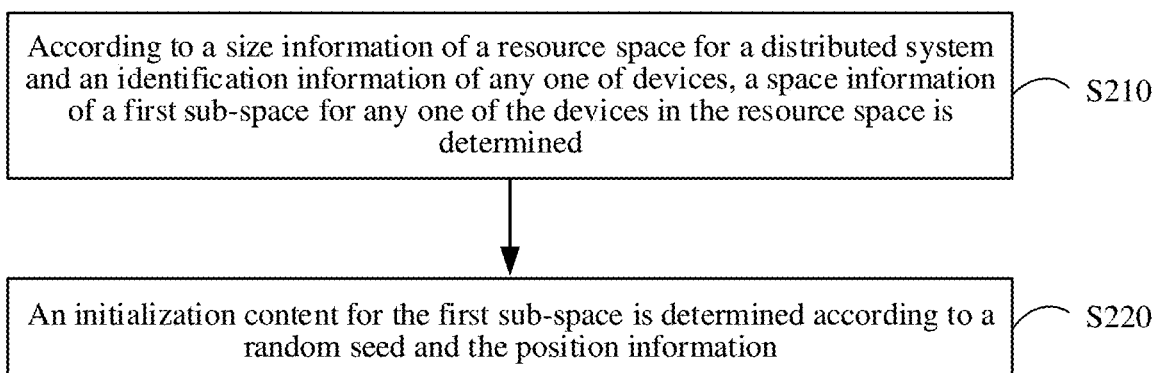
FIG. 2 is a schematic flowchart of a content initialization method according to an embodiment of the present disclosure.

As shown in FIG. 2, the content initialization method 200 of this embodiment may include operations S210 to S220.

In operation S210, according to a size information of a resource space for a distributed system and an identification information of any one of devices, a space information of a first sub-space for any one of the devices in the resource space is determined.

According to the embodiment of the present disclosure, the distributed system may include, for example, a plurality of devices, each of which is allocated with a resource space, and the resource spaces of the plurality of devices constitute the resource space of the distributed system. That is, the resource space allocated to each device is a sub-space in the resource space of the distributed system. The resource spaces may be evenly allocated to the plurality of devices, or a size of the resource space allocated to each device of the plurality of devices may be determined according to the performance of the each device.

For example, each of the plurality of devices may be assigned with an identification information. For example, the identification information may include a number. The embodiment may assign numbers that increase in sequence for the plurality of devices according to an order of calling the sub-spaces allocated to the devices. The number may be used as the identification information. Among them, the order of calling the allocated sub-spaces may reflect a position information of the sub-space in the resource space.

In this way, the embodiment may determine the position information of the sub-space allocated for any one of the devices for the resource space according to the size information of the resource space and the identification information of any one of the devices. The space information determined in operation S210 includes the position information. For example, a size of the resource space for the distributed system is set to 2×64. The numbers assigned to six devices increase in step of 1 by taking 0 as a starting value. Resource spaces are evenly allocated to the six devices. A size of the first sub-space allocated to the device having a number of 3 may be 2×6. For example, if the resource space is represented by a 2×64 matrix, the position information of the first sub-space for the resource space may be represented by the $13^{th}$ column to the $18^{th}$ column.

It may be understood that the above method of determining position information is only used as an example to facilitate understanding of the present disclosure, which is not limited in the present disclosure.

In operation S220, an initialization content for the first sub-space is determined according to a random seed and the position information.

According to the embodiment of the present disclosure, a series of random numbers for the resource space may be generated by using a random function, and among the series of random numbers, the random number(s) corresponding to the position information of the first sub-space for the resource space may be used as the initialization content for the first sub-space.

The random seed is used as an initial value of the random function, so that the random function may iterate continuously by taking the random seed as a reference to obtain a series of random numbers. The random function may be, for example, preset and then input into any one of the devices. By setting the random seed and random function, a series of random numbers generated by calling the random function for n times are identical for each device of the plurality of devices.

For example, if the resource space is represented by a 2×64 matrix and the position information of the first sub-space for the resource space may be represented by the $13^{th}$ column to the $18^{th}$ column, the operation S220 may call a random function 2*12=24 times to obtain a series of random numbers, and call the random function for the $25^{th}$ to the $36^{th}$ times to obtain 12 random numbers, which are used as the initialization content for the first sub-space.

It may be understood that an element in the matrix representing the resource space may, for example, correspond to a byte or a kilobyte in the resource space, which is not limited in the present disclosure.

In view of the above, according to the input size information, the identification information and the random seed of resource space, the method of the embodiment of the present disclosure may enable each device in the distributed system to complete the initialization of the allocated resource space. The whole process does not require a use of shared space or a complex copy operation. A content initialization may be completed on a basis of reducing device interaction, so as to simplify a process of content initialization and improve an efficiency of the content initialization.

Figure 3:
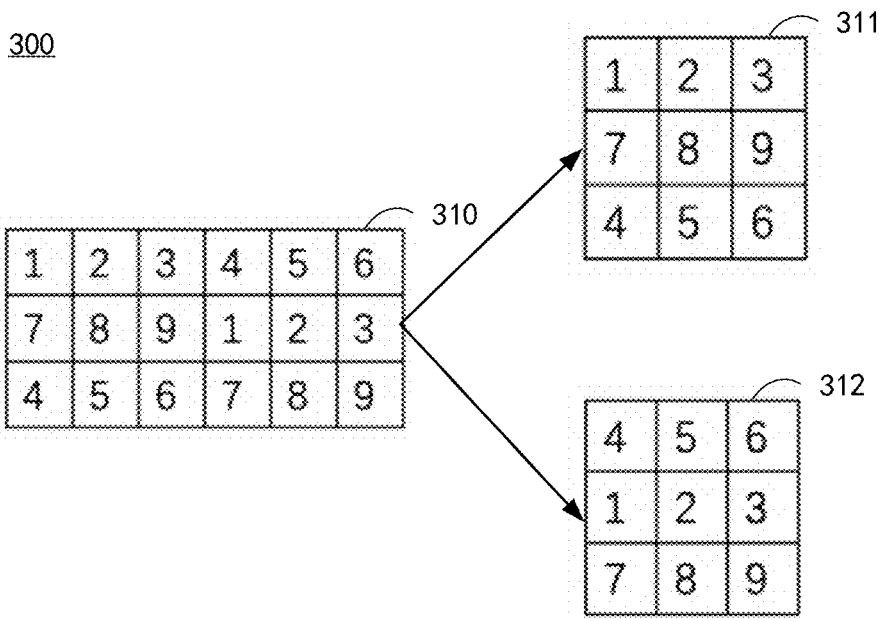
FIG. 3 is a schematic diagram of a content initialization method according to an embodiment of the present disclosure.

FIG. 3 is a schematic diagram of a content initialization method according to an embodiment of the present disclosure.

According to the embodiment of the present disclosure, when initializing the content of the resource space, it is also possible to initialize the content according to a predetermined distribution, so that an initialization result is more compliant with natural law and practical requirements.

For example, when determining the initialization content for the first sub-space, the embodiment may determine pseudo-random number(s) of the first sub-space based on the position information of the random seed and the first sub-space for the resource space. That is, by taking the random seed as the initial value, random number(s) corresponding to the first sub-space generated by the aforementioned method of calling the random function is/are taken as the pseudo-random number(s). Then, random number(s) conforming to the predetermined distribution is/are generated according to the pseudo-random number(s), and the random number(s) conforming to the predetermined distribution is/are used as the initialization content of the first sub-space.

For example, the pseudo-random number may be generated by calling a random( ) function, and the predetermined distribution may be Gaussian Distribution or Uniform Distribution, etc., which is not limited in the present disclosure. The embodiment may use Box-Muller method and the like to generate the random number conforming to the Gaussian distribution according to the pseudo-random number, which is not limited in the present disclosure.

In one embodiment, the resource space of the distributed system may include, for example, a plurality of meta-spaces. By dividing the resource space, a plurality of sub-spaces allocated to the plurality of devices in the distributed system may be obtained. The sub-space allocated to each device may include at least one meta-space. Each meta-space refers to, for example, a space occupied by a byte or a kilobyte, which is not limited in the present disclosure.

When implementing the content initialization method in this embodiment, an initialization value may be generated for each meta-space included in the first sub-space of any one of the devices, and all initialization values generated for all meta-spaces included in the first sub-space are used as the initialization content for the first sub-space.

For example, if the distributed system includes two devices, the resource space of the distributed system is divided into 3×6 meta-spaces and the sub-spaces allocated to the two devices are obtained by equally dividing the resource space, the sub-space allocated to each of the two devices includes 3×3 meta-spaces. For a second device of the two devices, the space information of the first sub-space for the second device may include the size information of the first sub-space and the position information of the first sub-space for the resource space. In the embodiment 300, the first sub-space may have a size information represented by 3×3 and a position information represented by the fourth column to the sixth column, that is, the first sub-space is composed of the meta-spaces in the fourth column to the sixth column in the resource space.

Accordingly, when determining the initialization content for the first sub-space, a starting pseudo-random number for the first sub-space may be determined according to the position information of the random seed and the first sub-space in the resource space. For example, the first sub-space includes meta-space in the fourth column to the sixth column in a 3×6 meta-spaces, and thus the starting pseudo-random number may be the pseudo-random number generated for the meta-space in the last row in the third column. Then, at least one pseudo-random number for at least one meta-space may be generated according to a number of at least one meta-space included in the first sub-space and the starting pseudo-random number. For example, the first sub-space is set to include 3×3 meta spaces, i.e. a total of 9 meta spaces. This embodiment may use the starting pseudo-random number as the starting value to generate 9 pseudo-random numbers corresponding to 9 meta-spaces by calling the random function for 9 times. It may be understood that when generating pseudo-random numbers for 9 meta-spaces, they may be generated row by row or column by column, which is not limited in the present disclosure.

For example, as shown in FIG. 3, by performing the content initialization method of this embodiment, the initialization content of each sub-space may be obtained. For example, the initialization content of the sub-space allocated to a first device of the two devices may be, for example, expressed in a form of matrix 311, and the initialization content of the sub-space allocated to a second device of the two devices may be, for example, expressed in a form of matrix 312. The initialization content of the resource space of the distributed system may be obtained by splicing the two matrices according to identifications of the two devices in an order from first to last. The initialization content may be, for example, expressed in a form of matrix 310. Each element in the matrix represents the initialization value of the meta-space.

Figure 4:
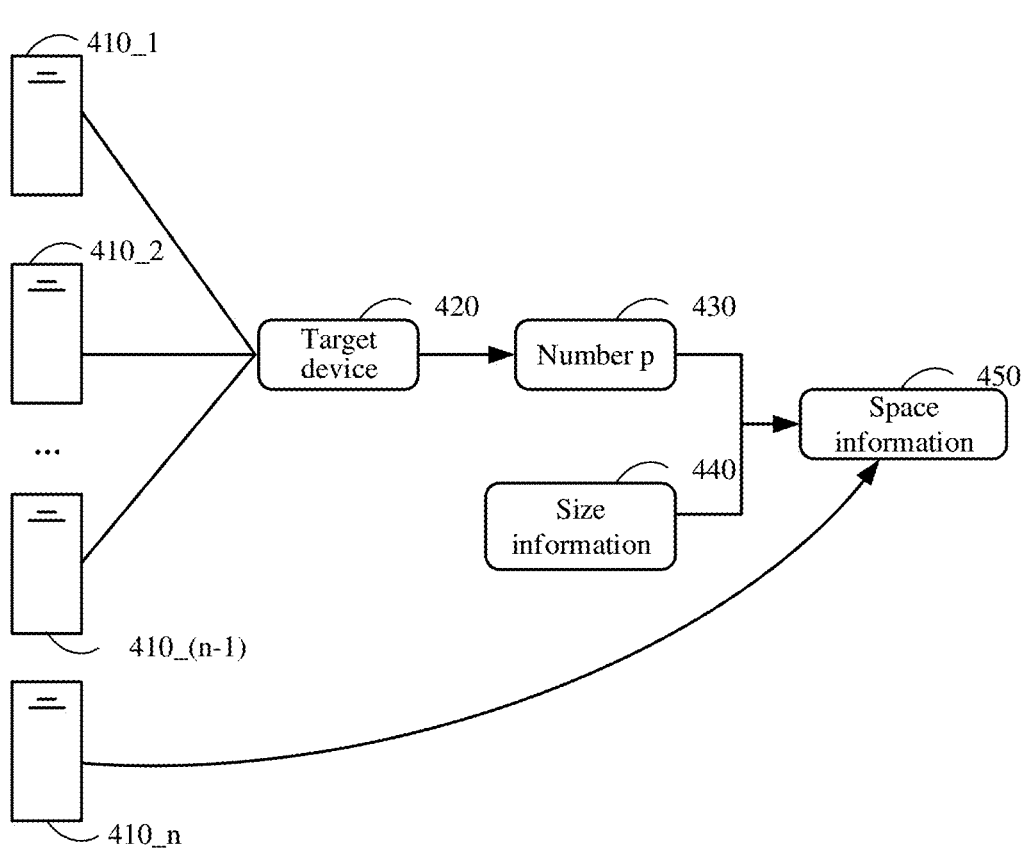
FIG. 4 is a schematic diagram of a principle for determining a space information of a first sub-space according to an embodiment of the present disclosure.

FIG. 4 is a schematic diagram of a principle for determining a space information of a first sub-space according to an embodiment of the present disclosure.

According to the embodiment of the present disclosure, if the sub-spaces allocated to a plurality of devices are obtained by equal division, a target device may be determined when determining the space information of the first sub-space of any one of the devices. The sub-space allocated to the target device is to be called before calling the first sub-space in the plurality of devices. In the resource space, the sub-space allocated to the target device precedes the first sub-space, and specifically, has a position in the resource space preceding a position of the first sub-space.

For example, if the identification information allocated to the plurality of devices are numbers that increase by step in an order of calling the sub-spaces, the embodiment may determine the number of the target device(s) according to the identification information of any one of the devices.

For example, as shown in FIG. 4, in the embodiment 400, the plurality of devices include device 410_1 to device 410_$n$, a total of n devices. The identification information of the n devices are 1 to n respectively. For the device with identification information n, the determined target devices include device 410_1 to device 410_$(n-1)$, a total of (n−1)

devices. That is, in this embodiment, the device whose identification information is less than that of any one of the plurality of devices may be regarded as a target device 420. Subsequently, the embodiment 400 may determine the space information of the first sub-space according to the number p430 of the target devices 420 and the size information of the resource space 440. For example, it is assume that the size information of the resource space is represented by m×2n, that is, the resource space includes m rows and 2n columns of meta-spaces. If the sub-space allocated to each device includes m rows and 2 columns of meta-spaces, all sub-spaces allocated to the target devices 420 are composed of the first to the $2p^{th}$ columns of meta-spaces in the resource space. The first sub-space allocated to any one of the devices is composed of the $(2P+1)^{th}$ column to the $(2\ (p+1))^{th}$ column of the resource space. The space information of the first sub-space may be represented by the $(2P+1)^{th}$ column to the $(2\ (p+1))^{th}$ column. Among them, m, n, p are integers greater than 1, and p is less than n.

For example, if any one of the devices is device 410_*n*, a value of p is (n−1) and the space information 450 of the first sub-space allocated to the device 410_*n* may be represented by the $(2n-1)^{th}$ column to the $(2n)^{th}$ column.

Figure 5:
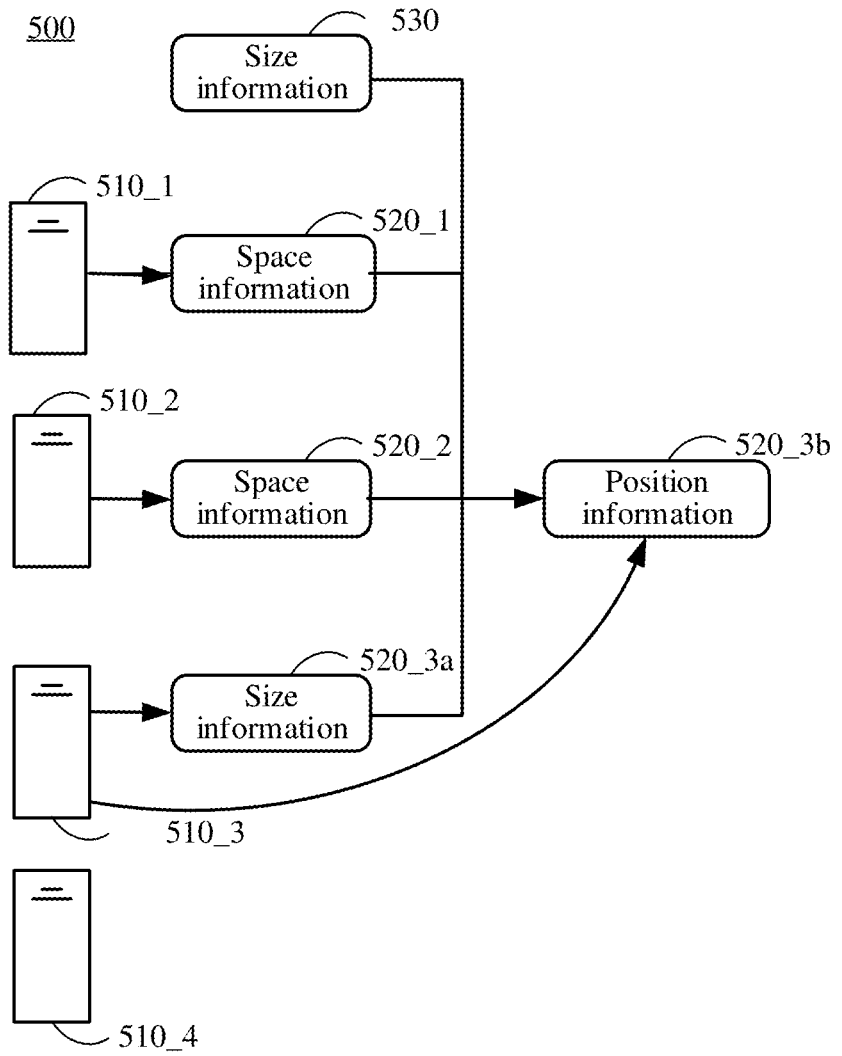
FIG. 5 is a schematic diagram of a principle for determining a space information of a first sub-space according to another embodiment of the present disclosure.

FIG. 5 is a schematic diagram of a principle for determining a space information of a first sub-space according to another embodiment of the present disclosure.

According to the embodiment of the present disclosure, if the sub-spaces allocated to the plurality of devices is obtained by unequal division, the space information of each sub-space will include a size information in addition to a position information. For example, when determining the space information of the first sub-space of any one of the devices, it is desired to determine the target device, the sub-space allocated to which is to be called before calling the first sub-space, from among the plurality of devices, and then determine the position information of the first sub-space by taking the space information of the sub-space allocated to the target device, the size information of the first sub-space, and the size information of the resource space for the distributed system as inputs. When the content initialization method is implemented, it is desired to input the size information of the plurality of sub-spaces allocated to the plurality of devices. The size information indicates, for example, a number of meta-spaces included in each sub-space.

For example, as shown in FIG. 5, in the embodiment 500, the plurality of devices include device 510_1 to device 510_4, a total of 4 devices. For example, the identification information of the four devices are 1 to 4 respectively. Then for device 510_3, the determined target devices include device 510_1 to device 510_2.

Subsequently, the embodiment 500 may determine a position information 520_3*b* of the sub-space allocated to the device 510_3, according to a space information 520_1 of sub-space allocated to the device 510_1, a space information 520_2 of sub-space allocated to the device 510_2, a size information 520_3*a* of device 510_3 and a size information 530 of the resource space.

For example, it is assume that the size information of resource space is represented by 2×30, that is, the resource space includes two rows and 30 columns of meta-spaces. In a case of the size information of the sub-space allocated to the device 510_1 is represented by 2×4, the position information is represented by the first column to the fourth column. The size information of sub-space allocated to the device 510_2 is represented by 2×6, the position information is represented by the $5^{th}$ column to the $10^{th}$ column. The size information 520_3*a* of sub-space allocated to the device 510_3 is represented by 2×3, the position information 520_3*b* of the first sub-space may be determined as the $(4+6+1)^{th}$ column to the $(4+6+3)^{th}$ column, to indicate that the first sub-space includes the $(4+6+1)^{th}$ column to the $(4+6+3)^{th}$ column in the meta-space array with 2 rows and 30 columns.

It may be understood that when the sub-spaces allocated to the plurality of devices are obtained by unequal division, the user is required to input the size information of the sub-spaces allocated to the plurality of devices through the user interface provided by the electronic device described above. In the embodiment, when determining the space information of the first sub-space, the position information of the first sub-space is substantially determined.

In the embodiment, when initializing the content, the resource space may be divided as desired in practice by inputting the size information of the sub-space allocated to the plurality of devices, so as to fully consider a respective computing performance of the plurality of devices and improve an execution efficiency of the deep learning task.

According to the embodiments of the present disclosure, the above embodiments may also, for example, set an upper limit value and a lower limit value for the generated initialization content in content initialization, to make the generated initialization content to be more compliant with practical requirements.

For example, when generating a random number conforming to a predetermined distribution, according to a pseudo-random number, a random number having a value greater than or equal to a lower limit value and less than or equal to an upper limit value is generated by an algorithm matching with the predetermined distribution, as the initialization content of the first sub-space. Among them, if the predetermined distribution is Gaussian, the algorithm matching with the predetermined distribution may include, for example, Box-Muller algorithm. For the Gaussian distribution, the lower limit value may be 0, and the upper limit value may be 1, which is not limited in the present disclosure.

In view of the above, the content initialization method provided in the present disclosure may be implemented by each of the plurality of devices included in the distributed system. With this initialization method, the initialization content generated by each device may be the same as the initialization content generated for the sub-space of each device by virtue of shared space, so that the distributed system may initialize the content like a single device. Since this method does not require a use of shared space, the process of content initialization may be simplified.

Based on the content initialization method provided by the present disclosure, the present disclosure further provides a content initialization apparatus. The apparatus will be described in detail below with reference to FIG. 6.

Figure 6:
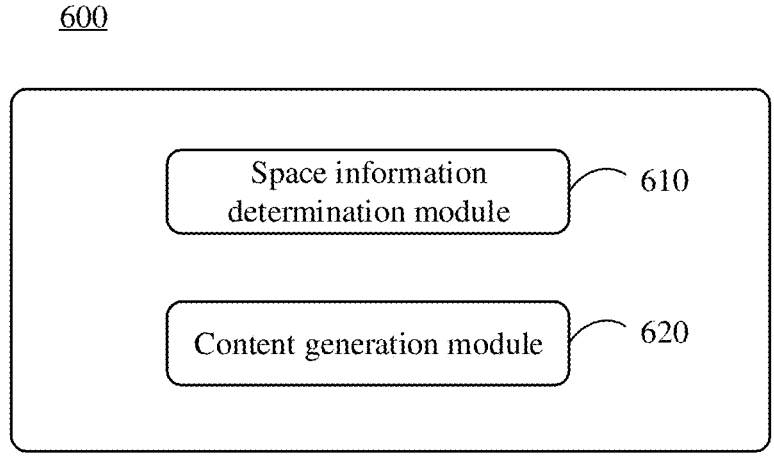
FIG. 6 is a structural block diagram of a content initialization apparatus according to an embodiment of the present disclosure.

FIG. 6 is a structural block diagram of a content initialization apparatus according to an embodiment of the present disclosure.

As shown in FIG. 6, the content initialization apparatus 600 of this embodiment may include a space information determination module 610 and a content generation module 620. The content initialization apparatus 600 may be provided in any one of a plurality of devices included in the distributed system.

The space information determination module 610 is configured to determine, according to a size information of a resource space for the distributed system and an identification information of the any one of the plurality of devices,

US 12,563,114 B2

9

10 a space information of a first sub-space for any one of the plurality of devices in the resource space. The space information includes a position information of the first sub-space for the resource space. In one embodiment, the space information determination module 610 may be configured to perform the operation S210 described previously, which will not be repeated here.

The content generation module 620 is configured to determine an initialization content for the first sub-space according to a random seed and the position information. In one embodiment, the content generation module 620 may be used to perform the operation S220 described previously, which will not be repeated here.

According to the embodiment of the present disclosure, the content generation module 620 may include a pseudo-random number generation sub-module and a content generation sub-module. The pseudo-random number generation sub-module is configured to determine a pseudo-random number of the first sub-space according to the random seed and the position information. The content generation sub-module is configured to generate a random number conforming to a predetermined distribution according to the pseudo random number, as the initialization content of the first sub-space.

According to an embodiment of the present disclosure, the first sub-space includes at least one meta-space. The pseudo-random number generation sub-module may include a determination unit and a generation unit. The determination unit is configured to determine a starting pseudo-random number for the first sub-space according to the position information and the random seed. The generation unit is configured to generate at least one pseudo-random number for the at least one meta-space respectively, according to the starting pseudo-random number and a number of the at least one meta-space.

According to the embodiment of the present disclosure, the space information determination module 610 may include a target device determination sub-module and a position determination sub-module. The target device determination sub-module is configured to determine a target device from the plurality of devices according to the identification information of the any one of the plurality of devices, wherein a sub-space for the target device in the resource space precedes the first sub-space. The position determination sub-module is configured to determine the position information of the first sub-space for the resource space, according to a size information of the resource space, a space information of a second sub-space for the target device in the resource space and a size information of the first sub-space, wherein the space information further includes a size information.

According to the embodiment of the present disclosure, the space information determination module 610 may include a target device determination sub-module and a space determination sub-module. The target device determination sub-module is configured to determine a target device from the plurality of devices according to the identification information of the any one of the plurality of devices, wherein a sub-space for the target device in the resource space precedes the first sub-space. The space determination sub-module is configured to determine the space information of the first sub-space according to a size information of the resource space and a number of the target device.

According to the embodiment of the present disclosure, the above content generation sub-module is specifically configured to generate, according to the pseudo-random number, a random number having a value greater than or equal to a lower limit value and less than or equal to an upper limit value by an algorithm matching with the predetermined distribution, as the initialization content of the first sub-space.

It should be noted that collecting, storing, using, processing, transmitting, providing, and disclosing etc. of the personal information of the user involved in the present disclosure all comply with the relevant laws and regulations, and do not violate the public order and morals. In the technical solution of this disclosure, the user's authorization or consent is obtained before the user's personal information is acquired or collected.

According to the embodiments of the present disclosure, the present disclosure further provides an electronic device, a readable storage medium, and a computer program product.

Figure 7:
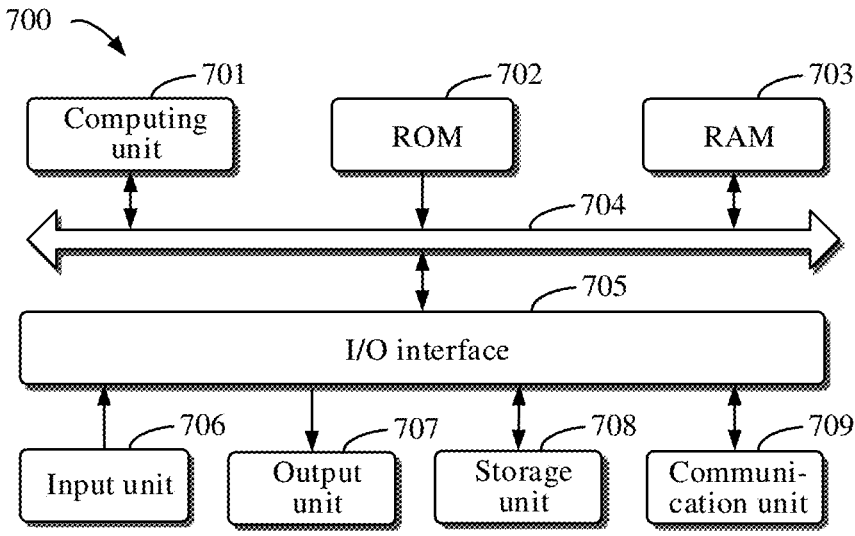
FIG. 7 is a block diagram of an electronic device for implementing a content initialization method according to an embodiment of the present disclosure.

FIG. 7 shows a schematic block diagram of an example electronic device 700 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 may include computing unit 701, which may perform various appropriate actions and processing based on a computer program stored in a read-only memory (ROM) 702 or a computer program loaded from a storage unit 708 into a random access memory (RAM) 703. Various programs and data required for the operation of the electronic device 700 may be stored in the RAM 703. The computing unit 701, the ROM 702 and the RAM 703 are connected to each other through a bus 704. An input/output (I/O) interface 705 is further connected to the bus 704.

Various components in the electronic device 700 are connected with I/O interface 705, including an input unit 706, such as a keyboard, a mouse, etc.; an output unit 707, such as various types of displays, speakers, etc.; a storage unit 708, such as a magnetic disk, an optical disk, etc.; and a communication unit 709, such as a network card, a modem, a wireless communication transceiver, etc. The communication unit 709 allows the electronic device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 701 may perform the various methods and processes described above, such as the method of storing data and the method of reading data. For example, in some embodiments, the method of storing data and the method of reading data may be implemented as a computer software program that is tangibly contained on a machine-readable medium, such as a storage unit 708. In some embodiments, part or all of a computer program may be loaded and/or installed on the electronic device 700 via the ROM 702 and/or the communication unit 709. When the computer program is loaded into the RAM 703 and executed by the computing unit 701, one or more steps of the method of storing data and the method of reading data described above may be performed. Alternatively, in other embodiments, the computing unit 701 may be configured to perform the method of storing data and the method of reading data in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, also referred to as a cloud computing server. It is a host product in the cloud computing service system to solve the problems of difficult management and weak business scalability in traditional physical hosts and VPS services ("Virtual Private Server", or "VPS" for short). The server may also be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A content initialization method applied to any one of a plurality of devices comprised in a distributed system, wherein the method comprises:

determining, according to a size information of a resource space for the distributed system and an identification information of the any one of the plurality of devices, a space information of a first sub-space for the any one of the plurality of devices in the resource space, wherein the space information comprises a position information of the first sub-space in the resource space, wherein the determining the space information comprises:

determining a target device from the plurality of devices according to the identification information of the any one of the plurality of devices, wherein a sub-space for the target device in the resource space precedes the first sub-space; and determining the position information of the first sub-space in the resource space, according to the size information of the resource space, a space information of a second sub-space for the target device in the resource space and a size information of the first sub-space;

determining an initialization content for the first sub-space according to a random seed and the position information by using a random function, wherein determining the initialization content comprises generating a random number conforming to a predetermined distribution according to a pseudo-random number, as the initialization content of the first sub-space; and completing an initialization of the first sub-space based on the initialization content to reserve the first sub-space, wherein the identification information is allocated in sequence for the plurality of devices according to an order of calling sub-spaces allocated to the plurality of devices in the resource space, and the order of calling the sub-spaces reflects the position information of the sub-spaces in the resource space.

2. The method of claim 1, wherein the determining an initialization content for the first sub-space according to a random seed and the position information further comprises determining the pseudo-random number of the first sub-space according to the random seed and the position information by using the random function.

3. The method of claim 2, wherein the first sub-space comprises at least one meta-space; and wherein the determining a pseudo-random number of the first sub-space according to the random seed and the position information comprises:

determining a starting pseudo-random number for the first sub-space, according to the position information and the random seed by using the random function; and generating at least one pseudo-random number for the at least one meta-space respectively, according to the starting pseudo-random number and a number of the at least one meta-space.

4. The method of claim 1, wherein the determining a space information of a first sub-space for the any one of the plurality of devices in the resource space comprises:

determining a target device from the plurality of devices according to the identification information of the any one of the plurality of devices, wherein a sub-space for the target device in the resource space precedes the first sub-space; and determining the space information of the first sub-space, according to a size information of the resource space and a number of the target device.

5. The method of claim 1, wherein the generating a random number conforming to a predetermined distribution according to the pseudo-random number, as the initialization content of the first sub-space, comprises generating, according to the pseudo-random number, a random number having a value greater than or equal to a lower limit value and less than or equal to an upper limit value by an algorithm matching with the predetermined distribution, as the initialization content of the first sub-space.

6. An electronic device comprising:
at least one processor; and a memory communicatively coupled with the at least one processor;

wherein the memory stores instructions executable by the at least one processor, and the instructions, when executed by the at least one processor, cause the at least one processor to at least:

determine, according to a size information of a resource space for a distributed system comprising a plurality of devices and an identification information of any one of the plurality of devices, a space information of a first sub-space for the any one of the plurality of devices in the resource space, wherein the space information comprises a position information of the first sub-space in the resource space, wherein the determination of the space information comprises:

determination of a target device from the plurality of devices according to the identification information of the any one of the plurality of devices, wherein a sub-space for the target device in the resource space precedes the first sub-space; and determination of the position information of the first sub-space in the resource space, according to the size information of the resource space, a space information of a second sub-space for the target device in the resource space and a size information of the first sub-space;

determine an initialization content for the first sub-space according to a random seed and the position information by using a random function, wherein determination of the initialization content comprises generation of a random number conforming to a predetermined distribution according to a pseudo-random number, as the initialization content of the first sub-space; and complete an initialization of the first sub-space based on the initialization content to reserve the first sub-space, wherein the identification information is allocated in sequence for the plurality of devices according to an order of calling sub-spaces allocated to the plurality of devices in the resource space, and the order of calling the sub-spaces reflects the position information of the sub-spaces in the resource space.

7. The electronic device of claim 6, wherein the instructions are further configured to cause the at least one processor to determine the pseudo-random number of the first sub-space according to the random seed and the position information by using the random function.

8. The electronic device of claim 7, wherein the first sub-space comprises at least one meta-space; and wherein the instructions are further configured to cause the at least one processor to:

determine a starting pseudo-random number for the first sub-space, according to the position information and the random seed by using the random function; and generate at least one pseudo-random number for the at least one meta-space respectively, according to the starting pseudo-random number and a number of the at least one meta-space.

9. The electronic device of claim 6, wherein the instructions are further configured to cause the at least one processor to:

determine a target device from the plurality of devices according to the identification information of the any one of the plurality of devices, wherein a sub-space for the target device in the resource space precedes the first sub-space; and determine the space information of the first sub-space, according to a size information of the resource space and a number of the target device.

10. The electronic device of claim 6, wherein the instructions are further configured to cause the at least one processor to generate, according to the pseudo-random number, a random number having a value greater than or equal to a lower limit value and less than or equal to an upper limit value by an algorithm matching with the predetermined distribution, as the initialization content of the first sub-space.

11. A non-transitory computer readable storage medium storing computer instructions, wherein the computer instructions are configured to cause a computer system to at least:

determine, according to a size information of a resource space for a distributed system comprising a plurality of devices and an identification information of any one of the plurality of devices, a space information of a first sub-space for the any one of the plurality of devices in the resource space, wherein the space information comprises a position information of the first sub-space in the resource space, wherein the determination of the space information comprises:

determination of a target device from the plurality of devices according to the identification information of the any one of the plurality of devices, wherein a sub-space for the target device in the resource space precedes the first sub-space; and determination of the position information of the first sub-space in the resource space, according to the size information of the resource space, a space information of a second sub-space for the target device in the resource space and a size information of the first sub-space;

determine an initialization content for the first sub-space according to a random seed and the position information by using a random function, wherein determination of the initialization content comprises generation of a random number conforming to a predetermined distribution according to a pseudo-random number, as the initialization content of the first sub-space; and complete an initialization of the first sub-space based on the initialization content to reserve the first sub-space, wherein the identification information is allocated in sequence for the plurality of devices according to an order of calling sub-spaces allocated to the plurality of devices in the resource space, and the order of calling the sub-spaces reflects the position information of the sub-spaces in the resource space.

12. The storage medium of claim 11, wherein the computer instructions are further configured to cause the computer system to determine the pseudo-random number of the first sub-space according to the random seed and the position information by using the random function.

13. The storage medium of claim 12, wherein the first sub-space comprises at least one meta-space; and wherein the computer instructions are further configured to cause the computer system to:

determine a starting pseudo-random number for the first sub-space, according to the position information and the random seed by using the random function; and generate at least one pseudo-random number for the at least one meta-space respectively, according to the starting pseudo-random number and a number of the at least one meta-space.

14. The storage medium of claim 11, wherein the computer instructions are further configured to cause the computer to:

determine a target device from the plurality of devices according to the identification information of the any one of the plurality of devices, wherein a sub-space for the target device in the resource space precedes the first sub-space; and determine the space information of the first sub-space, according to a size information of the resource space and a number of the target device.

15. The storage medium of claim 11, wherein the computer instructions are further configured to cause the computer to generate, according to the pseudo-random number, a random number having a value greater than or equal to a lower limit value and less than or equal to an upper limit value by an algorithm matching with the predetermined distribution, as the initialization content of the first sub-space.

* * * * *